United States Patent [19]

Kaganowicz et al.

[11] 4,072,985
[45] Feb. 7, 1978

[54] VIDEO DISC WITH A DIELECTRIC LAYER FORMED FROM STYRENE AND NITROGEN

[75] Inventors: Grzegorz Kaganowicz, Princeton, N.J.; John Walter Robinson, Levittown, Pa.

[73] Assignee: RCA Corporation, New York, N.Y.

[21] Appl. No.: 793,872

[22] Filed: May 4, 1977

[51] Int. Cl.² ............... H04N 1/28; B32B 3/02; B32B 15/08; B32B 15/20
[52] U.S. Cl. .................. 358/128; 179/100.1 B; 428/64; 428/626; 428/675
[58] Field of Search ............ 428/64, 65, 626, 675; 358/128; 179/100.1 B

[56] References Cited

U.S. PATENT DOCUMENTS

| | | | |
|---|---|---|---|
| 3,842,194 | 10/1974 | Clemens | 179/100.1 B |
| 3,842,217 | 10/1974 | Clemens | 179/100.1 B |
| 3,843,399 | 10/1974 | Kaplan et al. | 358/128 |
| 3,901,994 | 8/1975 | Mehalso et al. | 179/100.1 B |
| 3,909,517 | 9/1975 | Clemens | 179/100.1 B |
| 3,982,066 | 9/1976 | Nyman | 358/128 |
| 3,984,907 | 10/1976 | Vossen, Jr. et al. | 428/675 |
| 4,004,080 | 1/1977 | Vossen, Jr. et al. | 358/128 |

*Primary Examiner*—William J. Van Balen
*Attorney, Agent, or Firm*—H. Christoffersen; Birgit E. Morris; Joseph T. Harcarik

[57] ABSTRACT

This invention relates to a video disc with a thin polymeric dielectric layer formed from styrene and nitrogen. The dielectric layer has improved age deterioration resistance, wear characteristics and adhesion to a metal conductive layer.

10 Claims, 2 Drawing Figures

VIDEO DISC WITH A DIELECTRIC LAYER FORMED FROM STYRENE AND NITROGEN

REFERENCE TO RELATED APPLICATIONS

This application is related to copending application "Method of Depositing a Silicon Oxide Dielectric Layer" by E. B. Priestley and P. J. Call, Ser. No. 793,641; copending application "Method of Depositing a Lubricant Layer on a Video Disc" by A. D. Grubb and G. F. Nichols, Ser. No. 793,643; copending application "A Video Disc Capacitive Recording Means with a Conductive Bilayer" by J. L. Vossen, Ser. No. 793,644; and copending application "A Video Disc with a Conductive Layer Having an Oxygen Content Gradient" to J. L. Vossen, Ser. No. 793,640, which applications were filed concurrently with this application on May 4, 1977 and are herein incorporated by reference.

BACKGROUND OF THE INVENTION

An audio/video information system for recording and playing back audio/video information has been described in U.S. Pat. Nos. 3,842,194 and 3,842,217 to Clemens herein incorporated by reference. According to this system, audio/video information is recorded in the form of geometric variations in spiral grooves on the surface of the disc. Disc replicas are then made of an insulating material such as vinyl and are coated first with a conductive material and then with a dielectric film. A metallized stylus is utilized as a second electrode forming a capacitor with a video disc. The audio/video information is monitored by the stylus which notes changes in capacitance between the stylus and the video disc as the geometric variations in the form of depressions pass under the stylus. The groove density of video discs is generally from about 1,000 to about 10,000 grooves per inch (400–4000 grooves per centimeter).

In U.S. Pat. No. 3,843,399 to Kaplan et al., a polymeric dielectric coating for the video disc is described wherein the polymeric dielectric coating is formed from styrene deposited in a glow discharge. While this dielectric coating is operative, it has been desired to have a dielectric coating with improved wear, age deterioration resistance, and adhesion to the conductive layer. In U.S. Pat. No. 3,982,066 to Nyman et al. and in U.S. Pat. Nos. 3,984,907 and 4,004,080 to Vossen, Jr. et al., herein incorporated by reference, the adhesion of polymeric dielectric layers to a conductive layer is improved by utilizing copper in the conductive layer at the dielectric interface. The copper is either employed as a separate layer interposed between a nickel/chromium/iron alloy layer and the polymeric layer, or the copper is used to form a pseudo alloy with the nickel/chromium/iron alloy. While the copper improves adhesion, it is subject to corrosion which causes instability in the polymeric dielectric layer and aggravates the deterioration of the dielectric layer. It has thus been desired to improve the adhesion between a polymeric dielectric layer and a conductive metal layer which does not employ copper at the dielectric interface.

SUMMARY OF THE INVENTION

This invention pertains to a capacitive recording means comprised of a disc having a spiral groove on a face thereof with audio/video information in the form of geometric variations in said groove. A thin conductive layer is deposited on the face of the disc followed by the deposition of a polymeric dielectric layer formed from styrene and nitrogen in a glow discharge. It has been found that when the formed polymeric layer contains from about 2 to about 12 atomic percent of nitrogen, the age deterioration resistance and wear characteristics of the video disc are greatly improved. Furthermore, the adhesion of the polymeric dielectric layer to metal conductive layers which do not contain copper at the dielectric interface is also improved.

DETAILED DESCRIPTION OF THE INVENTION

Figure 1:
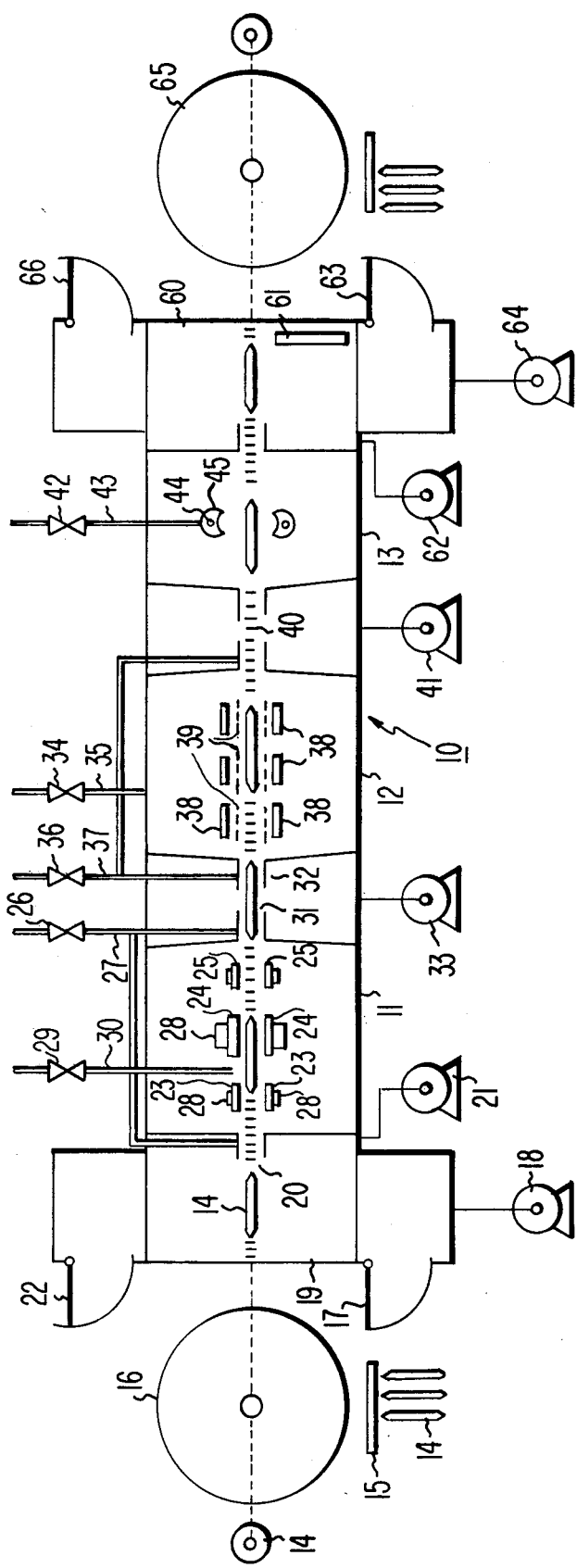
FIG. 1 is a schematic illustration of an apparatus for vacuum depositing in a continuous manner first a conductive layer, then a dielectric layer, and then a lubricant layer on a vinyl disc containing geometrically coated audio/video information.

A disc replica containing geometrically coated audio/video information is first prepared in a manner described in the Clemens' patents. Suitably the disc material is a vinyl such as polyvinyl chloride. Next, a conductive layer is deposited onto the vinyl discs. Suitably, the conductive layer is a bilayer comprised of a first thin copper layer and a second layer of a nickel/chromium/iron alloy wherein the iron content is less than 10% by weight.

The atomic percent of oxygen and other elements as employed in the specification and Claims is defined as that measured by Auger electron spectroscopy. The absolute value of the oxygen and other elements $\alpha(0)$, is determined by the following calibration: a pure silver sample is sputter etched removing about 300 angstroms and the Auger peak to peak magnitude for the Ag doublet (351:354ev) is recorded. This value is taken to be $\Delta(Ag)$. The peak to peak magnitude for the 0 (510) Auger peak and the sample to be measured is taken to be $\Delta(0)$. The absolute 0 value is calculated according to the equation $$\gamma(0) = \frac{\Delta(0)}{\Delta(Ag)} \times 1.03$$

The 1.03 factor for Ag is obtained from the Handbook of Auger Electron Spectroscopy, Palmberg et al.

According to the present invention, a polymeric dielectric layer formed from styrene and nitrogen in a glow discharge is then deposited on the conductive layer wherein the deposited polymeric layer contains from about 2 to about 12 atomic percent of nitrogen and preferably from about 4 to about 6 atomic percent of nitrogen. Suitably, the dielectric layer is from about 50 to about 500 angstroms thick.

It has been found that dielectric layers containing greater than 2 atomic percent nitrogen have marked improvement to age deterioration. For example, a video disc having a dielectric layer formed from styrene and containing less than 2 atomic percent nitrogen will deteriorate in about 6 months when stored in a cool dry atmosphere; and will deteriorate in about a week when stored in a hot humid environment. In contrast, a video disc having a dielectric layer containing about 5 atomic percent of nitrogen, will perform effectively after a year or more even when stored under hot humid conditions.

The nitrogen in the dielectric layer is obtained by adding nitrogen to styrene monomer in the glow discharge. The manner of obtaining sufficient amounts of nitrogen in the glow discharge will depend on whether a batch or continuous process is employed. For example, when a batch process is employed for deposition, the chamber containing the discs is first evacuated to about $10^{-6}$ torr. Before the glow is initiated, nitrogen is introduced to produce a partial pressure of about 3 to 30 microns and styrene monomer is introduced to produce a total pressure of about 5 to 60 microns with the partial pressure ratio of nitrogen to styrene at about 0.75:1 to about 4:1. When the glow is initiated it contains sufficient nitrogen to produce dielectric layers containing from about 2 to about 12 atomic percent nitrogen. The equilibrium pressure during glow discharge is from about 2 to 70 microns.

When a continuous apparatus is used for depositing the dielectric layer, a glow discharge containing sufficient quantities of nitrogen can be obtained by controlling the introduction rate of the nitrogen and styrene and the pressure of the glow discharge. For example, when vinyl discs 30.5 cm in diameter are to be coated at the rate of 720 per hour, the nitrogen is first introduced at a rate to produce a pressure of about 4 microns. The glow discharge is then activated. While maintaining the nitrogen flow rate and glow discharge, the styrene monomer is introduced in sufficient quantities to increase the glow discharge pressure up to about 8 microns. The deposited dielectric layers will also contain from about 2 to about 12 atomic percent of nitrogen.

After the dielectric layer has been deposited, a lubricant layer is deposited in accordance with the manner described in the above mentioned copending application to Grubb et al utilizing the methyl alkyl siloxane lubricants described in U.S. Pat. No. 3,833,408 to Matthies. Since the metal layers, dielectric layers and lubricant layers may be deposited under vacuum conditions in a continuous manner, a single apparatus may be employed for depositing all the layers which allows for rapid processing of the video disc.

FIG. 1 is a cross-sectional top view which schematically illustrates a vacuum chamber 10 which is divided into three connecting evacuated chambers; a metal deposition chamber 11, a dielectric deposition chamber 12, and an oil lubricant deposition chamber 13. Vinyl disc replicas 14 containing geometrically coated audio/video visual information are first assembled onto racks 15 by a disc assembler 16. The disc replicas 14 are then transported into the vacuum chamber 10 via an inlet pressure lock 17. As the vinyl disc 14 proceed through the inlet pressure lock 17, the pressure is reduced by means of a pump 18 to about 10 to 50 microns. This approximately equalizes the pressure in the inlet pressure lock 17 with the evacuated chamber 10 which is maintained at about 3 to 12 microns during operation. The vinyl discs 14 are then transported into a loading area 19 where the vinyl discs 14 are taken from the racks 15 and loaded singly in a vertical position onto a continuously moving conveyor belt 20 which advances about 0.2 feet (6 cm) per second. The vacuum in the loading area 19 is maintained by a pump 21. The racks 15 are removed from the loading area 19 by way of an exit pressure lock 22 after pressure in the lock 22 has been equalized with atmospheric pressure.

The video discs 14 which have been loaded onto the conveyor belt 20 ae conveyed into the metal deposition chamber 11 where metal layers are sputtered onto both sides of each vinyl disc 14. The deposited metal layers may consist of a bilayer of a copper layer and a nickel/chromium/iron alloy layer or a trilayer of a copper layer, a nickel/chromium/iron alloy layer and a copper layer. To deposit the bilayer, the vinyl discs 14 first pass between a pair of copper cathodes 23 which are about 4 inches (10 cm) × 14 inches (36 cm) in size and about 4 inches (10 cm) apart and then pass between a pair of nickel/chromium/iron alloy cathodes 24 which are about 14 inches (36 cm) × 29 inches (74 cm) in size and about 10 inches (25.4 cm) apart. To deposit a trilayer the vinyl discs further pass between a second pair of copper electrodes 25 which are similar to copper electrodes 23.

In order to sputter the metal from the cathodes onto the vinyl discs 14, about 220 standard cubic centimeters per minute (sccm) of argon gas is introduced through a valve 26 and a line 27. About 130 sccm of argon is introduced at the inlet of the chamber 11 and about 90 sccm of argon at the chamber exit. The pressure in the metal deposition chamber 11 is maintained at about 4 to about 8 microns. A glow discharge in the argon gas is created by supplying a current to the cathodes. Ions from the glow discharge (which are confined by means of magnetrons 28) strike the metal cathodes ejecting metal atoms. The metal atoms collect on the vinyl discs 14 forming metal layers. The copper layers are approximately 25 to 50 angstroms thick and the nickel/chromium/iron alloy layers are about 100 to 400 angstroms thick. In order to produce stable, stress-free films of nickel/chromium/iron alloy, oxygen is added through a valve 29 and a line 30 so as to produce a film containing about 5 to 20 atomic percent of oxygen in the alloy. When a conductive bilayer is employed the oxygen is introduced at a point where the vinyl discs 14 move towards the alloy cathodes 24, as shown in FIG. 1. Peak oxygen values of about 10 to 35 atomic percent will occur at the interface with the first copper layer and low oxygen values will occur at the interface with the polymeric dielectric layer. The low oxygen content at this interface has also been found to increase adhesion with the polymeric dielectric layer.

The vinyl discs 14 are then conveyed through a 2 inch (5 cm) wide tunnel 31 formed from metal sheets 32 into the dielectric deposition chamber 12. A low pressure is maintained in the tunnel by means of a vacuum pump 33 which minimizes cross-contamination of the gases in the metal deposition chamber 11 with the gases of the dielectric deposition chamber 12. In accordance with the present invention a dielectric layer prepared from styrene and nitrogen is deposited in a glow discharge. The styrene, as a styrene monomer, is added through a valve 34 and a line 35. Nitrogen gas is supplied through a valve 36 and a line 37. A glow discharge is created by supplying an electrical current to pairs of screen electrodes 39 and the discharge is confined by magnets 38. From 1 to 3 pairs of electrodes may be employed, depending upon the desired rate of deposition and layer thickness. The glow discharge breaks up the styrene monomer which copolymerizes with the nitrogen at the surface of the disc 14. Radio frequency current of about 1 ampere is supplied to the electrodes at a power of about 470 to about 1800 watts. The current can be varied to regulate the thickness and the degree of cross-linking of the deposited film and to regulate the heat buildup of the disc, which should not exceed about 130° F (54° C). The density of the screen electrodes 39 (open area/total area) regulates the amount of energy available to the styrene monomer and nitrogen surrounding the vinyl disc 14. This also affects the deposition thickness of the dielectric layer. Suitable screen densities are from about 0 to about 30%.

After the vinyl discs 14 are coated with the dielectric layer they are conveyed into the oil lubricant deposition chamber 13 through a second tunnel 40. The tunnel 40 is maintained at a low pressure by means of a vacuum pump 41 to prevent cross-contamination of the gases from the dielectric deposition chamber 12 with the gases of the lubricant deposition chamber 13. The lubricant oil to be deposited is added through a valve 42 and a line 43. The oil is vaporized in an oil vaporizer 44 by contacting the oil with a hot surface of about 250° C. As the oil vaporizes, it diffuses from the hot surface and is directed towards the discs 14 by means of a perforated vapor distributor 45. As the oil vapor contacts the discs 14, it condenses on the disc surfaces forming a thin uniform lubricant layer. The rate of oil vaporization, the geometry of the oil distributor 45, the pressure in the chamber 13 and the rate at which the disc 14 pass through the oil distributor 45 control the thickness of the lubricant oil layer. Suitable lubricant layer thicknesses are from about 90 to 400 angstroms and preferably about 180 to 230 angstroms.

The discs 14, now coated with a metal layer, a dielectric layer, and a lubricant oil layer, are conveyed into a disc collection area 60 where they are removed from the chain conveyor 20 and assembled onto a rack 61. A vacuum in the disc collection area is maintained by means of a pump 62. The rack 61 and the vinyl discs 14 are then transported through an outlet pressure lock 63 which has been evacuated by means of pump 64. The discs 14 and the rack 61 are removed from the vacuum chamber 10 after the outlet pressure lock 63 is brought to atmospheric pressure. A disc assembler 65 removes the vinyl discs 14 from the racks 61 and the racks 61 are returned to the vacuum chamber 10 by way of an inlet pressure lock 66.

The following Examples are presented to further describe the invention but it is not meant to limit the invention to the details described therein.

EXAMPLE 1

In this Example vinyl disc replicas, each approximately 30.5 cm in diameter and containing geometrically coated audio/video information in a spiral groove (5,555 grooves per inch) were coated with conductive layers, dielectric layers, and lubricant layers utilizing an apparatus as described in FIG. 1. The vinyl discs were coated at a rate of 720 per hour.

The deposited conductive layer was a bilayer consisting of a first copper layer about 50 angstroms thick and then an alloy layer of Inconel-600 (76.8% nickel, 13.8% chromium and 8.5% iron) about 200 angstroms thick. The metal deposition chamber was maintained at about 6 microns pressure, the copper cathodes were activated with 360 volts and 1.4 amperes of current and the magnetrons maintained a field of 330 gauss. The Inconel electrode was activated with 540 volts and 17.5 amperes of current.

The deposited dielectric layer contained about 5 atomic percent of nitrogen and the layer was 225 angstroms thick. In the dielectric chamber the nitrogen was first introduced to obtain a pressure of 4.3 microns. The glow was then activated by supplying 3.25 kilowatts of radio frequency power balance about equally between two pairs of electrodes. The screen density was 30 percent. Next the styrene monomer was introduced to increase the pressure to about 6.5 microns.

In the lubricant chamber a lubricant was added to the vaporizer at the rate of 6 ml/hr. The lubricant was a silicon compound having a viscosity of about 49.0 centistokes at 25° C and a specific gravity of 0.89 and having the formula

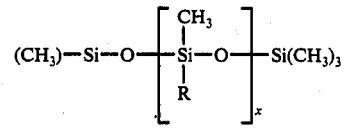

wherein R is an alkyl group of about 4–20 carbon atoms and $x$ is an integer. The vaporizer was maintained at a temperature of about 250° C, and the lubricant chamber was maintained at about 5 microns pressure. The deposited lubricant layer was 180 angstroms thick.

The coated vinyl discs were stored at 90° F (32° C) and 50% relative humidity for 1 year and then repeatedly played back by contacting the rotating disc with the stylus as described in the Clemens' patents. After 100 playbacks the video disc continued to function properly producing audio/visual information.

Figure 2:
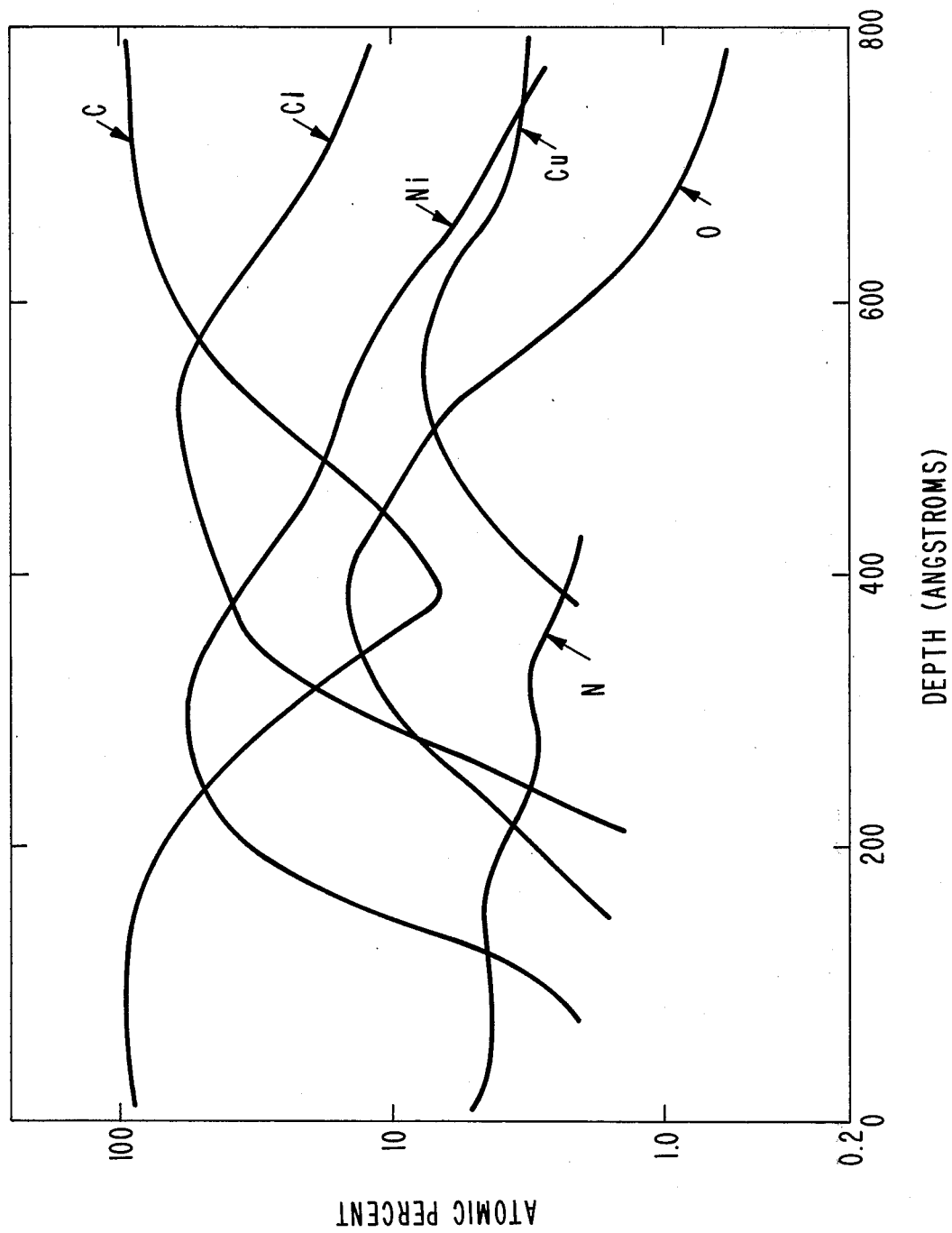
FIG. 2 is a graph of the atomic percent of the elements in a film of the invention as a function of sputter etch depth.

FIG. 2 is a graph of elements in the deposited layers of a vinyl disc prepared by this Example versus sputter etch depth as determined by Auger analysis and based on the sputtering rate of tantalum pentoxide.

EXAMPLE 2

In this Example a vinyl disc 30.5 cm in diameter and coated with a copper-Inconel bilayer as in Example 1 was coated with a nitrogen-containing dielectric layer in a 46 cm by 76 cm bell jar. The bell jar was evacuated to a pressure of $10^{-6}$ torr and then nitrogen was introduced to a partial pressure of 20 microns and styrene monomer added to a partial pressure of 28 microns. The dielectric layer was deposited by rotating the disc at a rate of 30 rpm between two 8 cm × 8 cm electrodes which covered a strip 5.5 cm wide on the disc. To create a glow, current was supplied to the electrodes at 300 milliamps and 10 kilohertz and with about 1000 volts. The deposition time was about 1.5 minutes. The dielectric layer was about 250 angstroms thick and contained about 7 atomic percent of nitrogen. A lubricant layer was then applied to the disc. After storage at 32° C and 50% relative humidity for 1 year, the disc continued to perform effectively after 100 playbacks.

CONTROL

This Example is presented as a control. The procedure of Example 2 was substantially repeated except that in the bell jar the initial partial pressure of nitrogen was 10 microns and the initial partial pressure of styrene monomer was about 14 microns. The deposition time was about 1 minute. The dielectric layer was found to contain about 1.5 atomic percent of nitrogen. It was found that the disc was worn after about 100 playbacks when stored for only about 3 weeks at 32° C and 50% relative humidity.

What is claimed is:

1. A capacitive recording means comprising a disc having a spiral groove on the face thereof with audio/video information in the form of geometric variations in said groove, a thin conductive layer thereon and a thin dielectric layer formed from styrene and nitrogen in a glow discharge on said conductive layer.

2. A recording means according to claim 1 wherein the dielectric layer contains from about 2 to about 12 atomic percent of nitrogen.

3. A recording means according to claim 1 wherein the dielectric layer contains from about 4 to about 6 atomic percent of nitrogen.

4. A recording means according to claim 1 wherein the dielectric layer is about 50 to 500 angstroms thick.

5. A recording means according to claim 1 wherein the conductive layer is a bilayer of a first copper layer and a nickel/chromium/iron alloy layer wherein the iron content is less than 10 percent by weight and the oxygen content is about 5 to about 20 atomic percent.

6. A recording means according to claim 5 wherein the copper layer is from about 25 to 50 angstroms thick and the alloy layer is from about 100 to 400 angstroms thick.

7. A capacitive recording means according to claim 1 wherein the recording means has a lubricant layer on said dielectric layer.

8. A capacitive recording means according to claim 7 wherein the lubricant layer is from about 90 to about 400 angstroms thick.

9. A capacitive recording means according to claim 7 wherein the lubricant layer is from about 180 to about 230 angstroms thick.

10. A capacitive recording means according to claim 7 wherein the lubricant layer is silicon compound having the formula

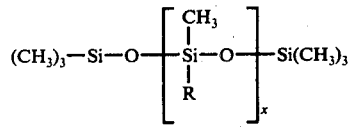

wherein R is an alkyl group of 4–20 carbon atoms and $x$ is an integer.

* * * * *